United States Patent
Cocchi et al.

(10) Patent No.: US 8,402,781 B2
(45) Date of Patent: Mar. 26, 2013

(54) MACHINE FOR MAKING BOTH ICE CREAMS AND SHAKE

(75) Inventors: Gino Cocchi, Bologna (IT); Gianni Zaniboni, Borgonuovo di Sasso Marconi (IT); Roberto Lazzarini, Reggio Emilia (IT)

(73) Assignee: Ali S.p.A. (IT)

( * ) Notice: Subject to any disclaimer, the term of this patent is extended or adjusted under 35 U.S.C. 154(b) by 1182 days.

(21) Appl. No.: 11/987,314

(22) Filed: Nov. 29, 2007

(65) Prior Publication Data

US 2008/0127837 A1 Jun. 5, 2008

(30) Foreign Application Priority Data

Nov. 30, 2006 (IT) ................. BO2006A0816

(51) Int. Cl.
 *A23G 9/00* (2006.01)
(52) U.S. Cl. ......................................... 62/342
(58) Field of Classification Search .............. 62/342, 62/390, 1
See application file for complete search history.

(56) References Cited

U.S. PATENT DOCUMENTS

| | | | | |
|---|---|---|---|---|
| 3,167,031 A * | 1/1965 | Taylor | .................. | 222/144.5 |
| 3,830,407 A * | 8/1974 | Wierlo | .................. | 222/145.6 |
| 4,881,663 A * | 11/1989 | Seymour | .................. | 222/132 |
| 5,145,092 A * | 9/1992 | Shannon | .................. | 222/61 |
| 5,158,506 A * | 10/1992 | Kusano et al. | .................. | 62/136 |
| 5,159,818 A * | 11/1992 | Etou et al. | .................. | 62/137 |
| 5,799,832 A * | 9/1998 | Mayo | .................. | 222/135 |
| 6,689,410 B2 * | 2/2004 | Gerber | .................. | 426/565 |
| 2005/0067433 A1 * | 3/2005 | Brandt et al. | .................. | 222/145.5 |

FOREIGN PATENT DOCUMENTS

| | | |
|---|---|---|
| DE | 44 29 077 A1 | 2/1996 |
| GB | 1004188 * | 9/1965 |
| WO | WO 98/31238 A | 7/1998 |
| WO | WO 2005/048730 A | 6/2005 |

* cited by examiner

*Primary Examiner* — Cheryl J Tyler
*Assistant Examiner* — Lakiya Rogers
(74) *Attorney, Agent, or Firm* — Timothy J. Klima; Shuttleworth & Ingersoll, PLC

(57) ABSTRACT

A machine for making two different types of product consisting respectively of ice creams and of shakes, includes: a main processing circuit for making the ice cream, having an infeed end associated with a tank for containing a product to be processed and an outfeed end associated with a mixing chamber; an auxiliary processing circuit for making the shake, having an infeed end associated with a tank for containing a diluting liquid and an outfeed end associated with the mixing chamber; a dispenser mechanism positioned at the mixing chamber dispensing the ice cream or the shake; and a selection device for selecting the type of product, equipped with at least a first and a second nozzle. Each nozzle can be associated with the mixing chamber in a corresponding condition for dispensing of the ice cream or the shake.

17 Claims, 4 Drawing Sheets

MACHINE FOR MAKING BOTH ICE CREAMS AND SHAKE

BACKGROUND OF THE INVENTION

The present invention relates to a machine for making both ice creams and shakes.

As is known, a machine of this type comprises, closed inside a base, a mixing tank connected by a pump to a freezing chamber, and a refrigerant unit consisting of a motor-driven compressor, a condenser and an evaporator associated with the freezing chamber. The front end of the freezing chamber is closed, at a vertical wall of the base, by a door inside which there is a cylindrical compartment. Inside the base there is also an environment, preferably refrigerated, containing a tank of diluting liquid (water or milk or a mixture of water and milk) and containers for flavoring syrups.

Pipes, with pumps inserted between them, connect the diluting liquid tank and the flavoring syrup containers to the cylindrical compartment.

A piston runs inside the cylindrical compartment, with each outward stroke dispensing a dose of ice cream or shake through a dispenser nozzle consisting of an opening made in a plate which closes the lower end of the cylindrical compartment.

The product dispensed consists of ice cream or shake, depending whether or not the cylindrical compartment is connected to the diluting liquid tank by suitable selector means.

In practice, to dispense ice cream, a screw mixer housed in the freezing chamber is activated to feed forward the product contained in the chamber towards the front end.

In this way, the product is fed into the cylindrical compartment in which a screw mixer mixes the product with one or more flavoring syrups, also distributed in the cylindrical compartment by respective pumps.

To dispense shake, the product is mixed with the diluting liquid distributed directly in the cylindrical compartment through the respective positive displacement pump. The positive displacement pump is activated by suitable electronic selector means which feed dosed quantities of diluting liquid.

In this way, the screw mixer mixes the products with any flavoring syrups, to obtain the shake, which is much more liquid than the ice cream.

As already indicated, both the ice cream and the shake are dispensed outside the cylindrical compartment by the action of the piston which pushes the product through the opening made in the lower plate.

The opening usually consists of a opening with a "star-shaped" extension to give the ice cream forced out through the opening an outline that has an attractive appearance.

However, it should be noticed that the particular shape of the opening, although functional for ice creams, has significant disadvantages for dispensing a shake.

A shake (significantly more liquid than ice cream) is dispensed in an uneven manner due to the breadth of the opening and the variation in its cross-section.

Said variation in the cross-section leads to the formation of turbulence in the flow of shake coming out of the opening, with the consequent formation of splashes which, detaching from the flow falling towards a respective container below the opening, are projected outside the container, affecting the zones surrounding the machine.

To overcome this disadvantage openings are made having a narrow cross-section for the passage of the product, to contain the flow of shake and limit the dispersion of splashes.

However, even in this situation there are significant disadvantages, because the flow of shake is still uneven and ice cream is not dispensed in the optimum way. Given the density of the ice cream, the time taken to dispense it through a noticeably smaller cross-section for its passage is longer.

SUMMARY OF THE INVENTION

The aim of the present invention is therefore to overcome the above-mentioned disadvantages by producing a machine for making two different types of product consisting respectively of ice creams and of shakes, able to dispense the two different products in the optimum way.

Accordingly, the present invention achieves this aim with a machine for making two different types of product consisting respectively of ice creams and of shakes, which has features as described herein.

BRIEF DESCRIPTION OF THE DRAWINGS

The technical features of the invention, in accordance with the afore-mentioned aims, are clearly indicated in the claims herein and the advantages of the invention are more apparent in the detailed description which follows, with reference to the accompanying drawings, which illustrate a preferred embodiment without limiting the scope of the invention, in which:

DESCRIPTION OF THE PREFERRED EMBODIMENTS

Figure 1:
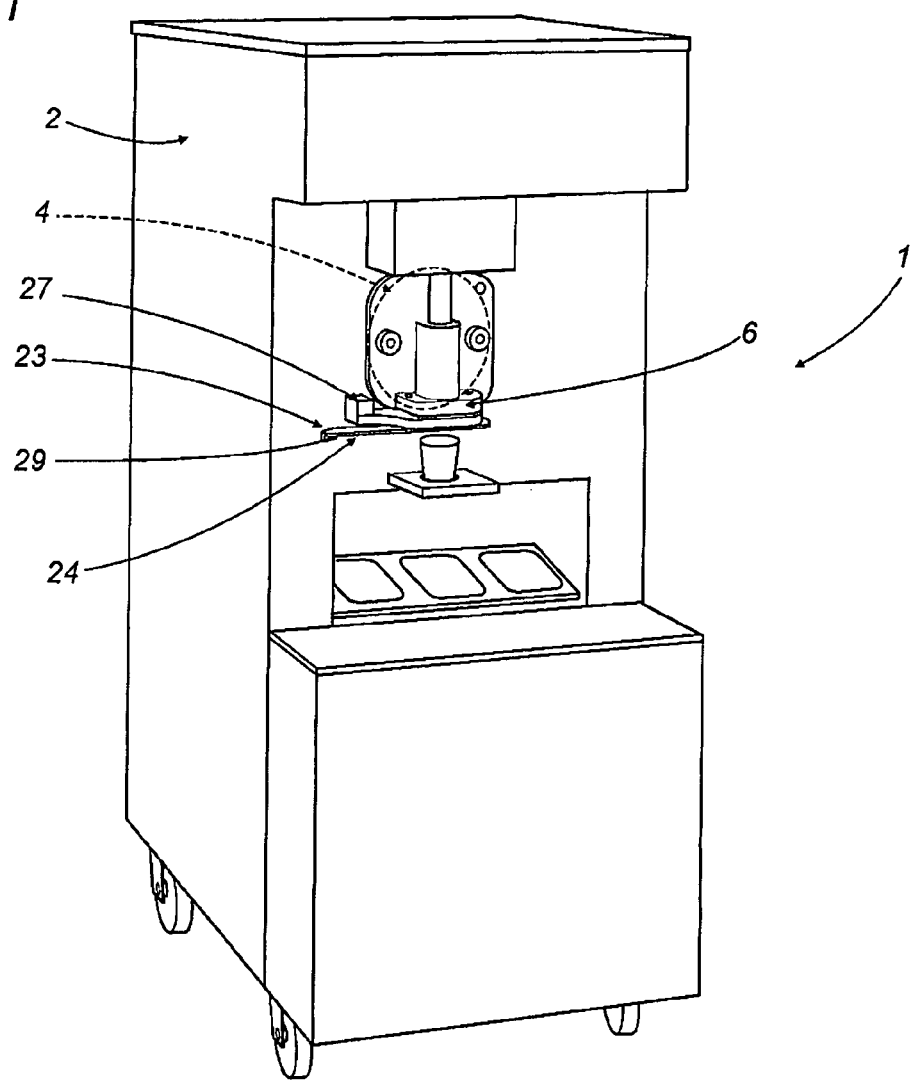
FIG. 1 is a schematic perspective view of a machine for making two different types of products, made in accordance with the present invention.
Figure 2:
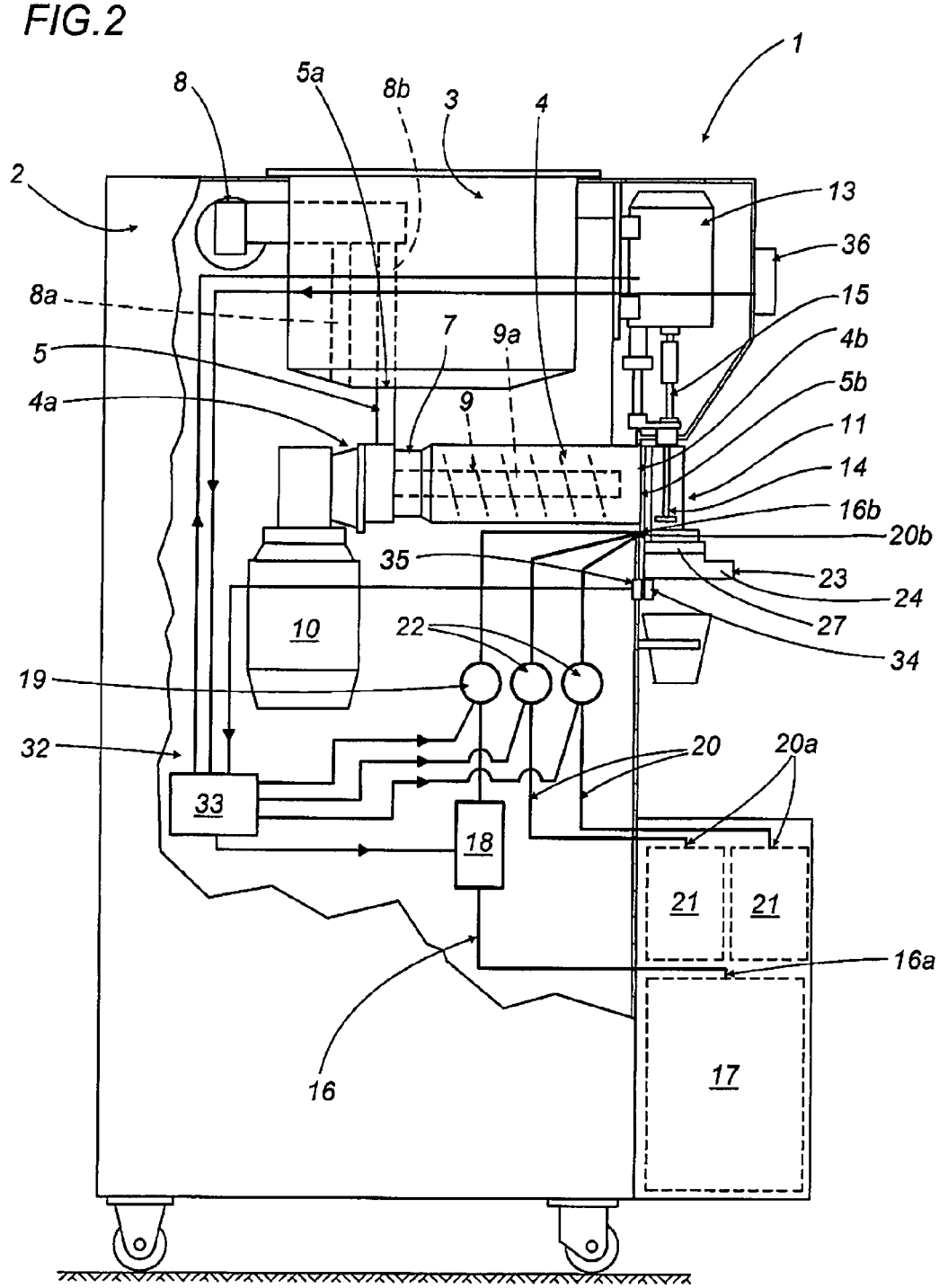
FIG. 2 is a side elevation view with some parts cut away to better illustrate others and some parts schematically illustrated with blocks, of the machine of FIG. 1.

With reference to FIGS. 1 and 2, the numeral 1 denotes as a whole a machine for making two different types of products consisting respectively of ice creams and of shakes.

The machine 1 comprises a substantially parallelepiped box-shaped frame 2 the top of which supports a tank 3 for containing a product to be processed, in the form of a liquid mixture, used as the base to obtain ice creams or shakes.

Inside the frame 2 there also extends a main processing circuit 5 designed to make the ice cream, having an infeed end 5a associated with the tank 3 and an outfeed end 5b associated with a mixing chamber 6.

In particular, as illustrated in FIG. 2, the main processing circuit 5 has a freezing chamber 4, and a refrigerant unit 7 schematically illustrated and consisting of a motor-driven compressor, a condenser and an evaporator (of the known type and therefore not described and illustrated in detail) associated with the freezing chamber 4.

The freezing chamber 4 has a substantially cylindrical shape and forms a rear end 4a associated with the tank 3 and a front end 4b forming the above-mentioned outfeed end 5b of the main processing circuit 5.

The product to be processed is fed by a gear pump 8, positioned at the tank 3 and in communication with the latter with an intake pipe 8a for drawing the product from the tank 3 and sending it through a delivery pipe 8b to the rear end 4a of the freezing chamber 4.

Extending inside the freezing chamber 4 there is a mixer 9 designed to feed forward the product to be processed from the rear end 4a to the front end 4b. The mixer 9 consists of a screw 9a driven to rotate about its own axis by respective movement means 10 such as a gear motor able to push the product towards and into a dispenser tap 11 mounted on the front end 4b of the freezing chamber 4.

Figure 3:
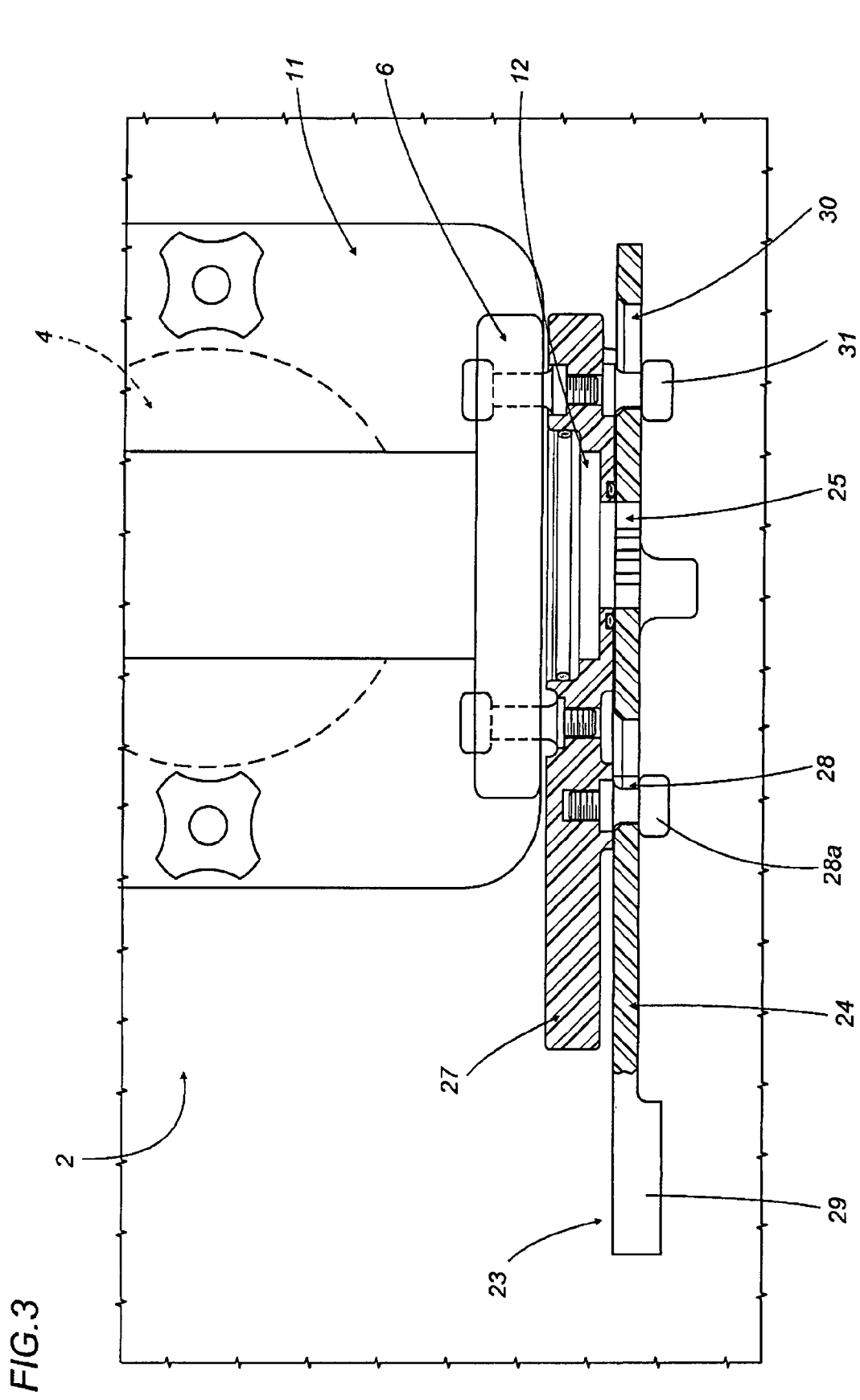
FIG. 3 is a front view of a portion of the machine of FIG. 1.

In particular, the dispenser tap 11 projects outside the frame 2 from a front wall of the frame 2 and inside forms the mixing chamber 6. The tap 11 also has an outfeed pipe 12 (FIG. 3) through which the ice cream or shake fed into the mixing chamber 6 is made to exit by suitable dispenser means 13 of the known type and therefore not described and illustrated in detail.

The dispenser means 13 consist of a mixing element 14 rotatably inserted in the mixing chamber 6 to mix the product to be processed inserted in the chamber 6 as described in more detail below. The dispenser means 13 also have an actuator 15 able to move in the mixing chamber 6 to open and close holes for delivery of the ice cream or shake towards the outfeed pipe 12.

The actuator 15 preferably consists of a piston operated electronically or manually using suitable levers, which can be inserted in the mixing chamber.

The machine 1 also has an auxiliary processing circuit 16 extending inside the box-shaped frame 2 and having an infeed end 16a associated with a tank 17 for containing a diluting liquid, and an outfeed end 16b associated with the mixing chamber 6.

In particular, the auxiliary processing circuit 16 is designed to dispense in the mixing chamber 6 a diluting liquid such as water or milk, for making the shake. As illustrated in FIG. 2, the auxiliary processing circuit 16 has a heating element 18 inserted between the tank 17 and the outfeed end 16b designed to heat the liquid-dispensed in the mixing chamber 6.

Advantageously, the tank 17 may be equipped with respective heating means not illustrated in the accompanying drawings and set up to keep the diluting liquid at a predetermined temperature.

The auxiliary processing circuit 16 also has a pump 19 inserted between the heating element 18 and the outfeed end 16b, to feed the liquid from the tank 17 to the mixing chamber 6. Advantageously, the machine 1 also comprises at least one circuit 20, also housed in the box-shaped frame 2, for feeding a flavoring syrup.

It should be noticed that FIG. 2 illustrates by way of example and therefore without limiting the scope of the invention two feed circuits 20 for respective syrups intended to give the ice cream or shake made a specific flavor. However, there may be any number of syrup feed circuits 20, depending on the variety of flavors to be given to the products dispensed by the machine 1.

Each syrup feed circuit 20 has a respective infeed end 20a associated with a tank 21 for containing the syrup and an outfeed end 20b associated with the mixing chamber 6. The circuit 20 also has a syrup feed pump 22 for distributing the syrup in the mixing chamber 6 after a respective command, as described in more detail below.

The machine 1 also comprises means 23 for selecting the type of product, which can be switched between an ice cream dispensing condition and a shake dispensing condition.

Figure 6:
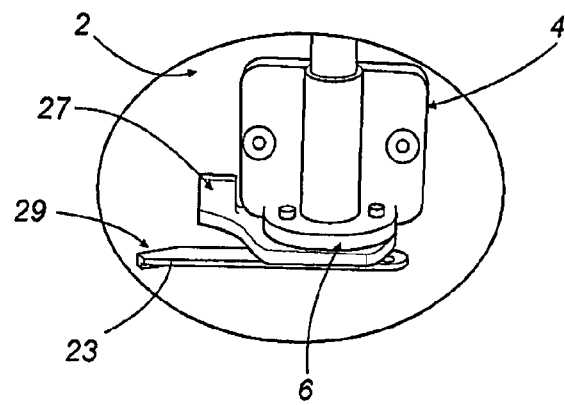
FIGS. 6 and 7 are scaled down schematic perspective views of the detail of the machine illustrated respectively in FIG. 4 and in FIG. 5.
Figure 7:
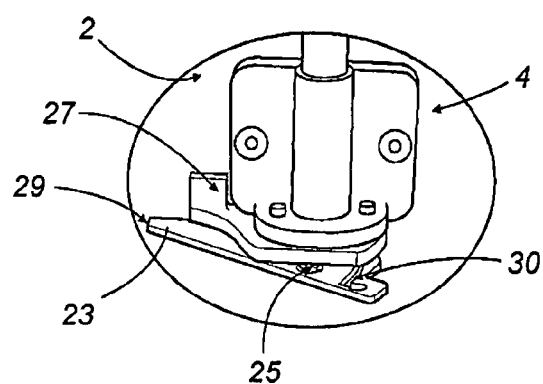
Figure 4:
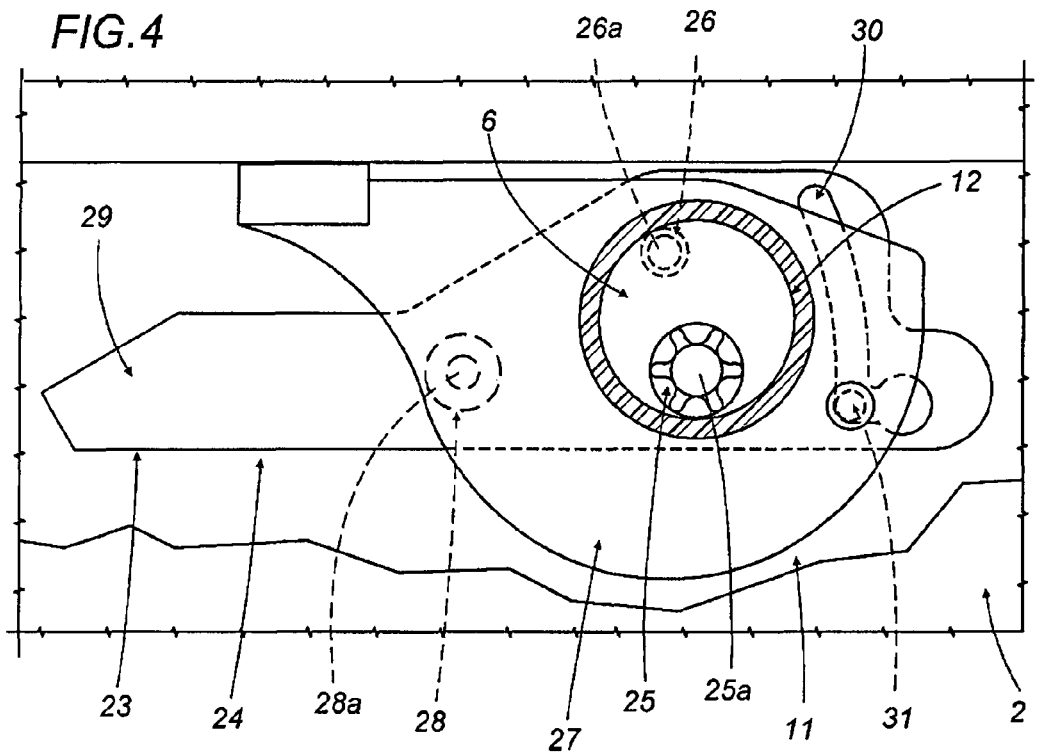
FIG. 4 is a top plan view with some parts cut away to better illustrate others of the portion of the machine of FIG. 3 in a first operating configuration.
Figure 5:
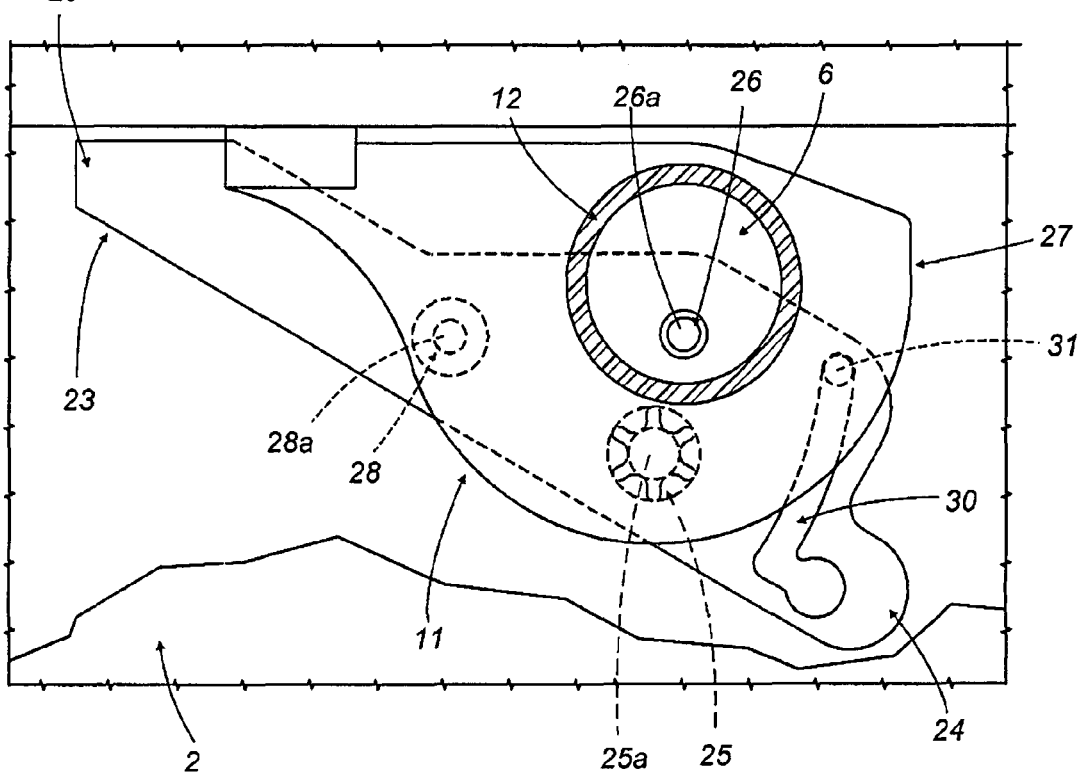
FIG. 5 is a top plan view with some parts cut away to better illustrate others of the portion of the machine of FIG. 3 in a second operating configuration.

As illustrated in detail in FIGS. 4 and 6 and, respectively, in FIGS. 5 and 7, the selection means 23 comprise a plate 24 associated at the outfeed pipe 12, on which there is a first and a second nozzle 25, 26 each of which may be associated with the mixing chamber 6 in a corresponding dispensing condition.

In particular, the plate 24 is removably associated with the tap 11, below it, to allow dispensing of the ice cream or the shake through the nozzles 25, 26.

In more detail, it should be noticed that at the bottom of the tap 11 there is a hollow base wall 27, closing the mixing chamber 6 and forming the above-mentioned pipe 12. The plate 24 has a portion 28 pivoting below the wall 27 by means of a pin 28a projecting from the wall 27 and adjacent to the pipe 12.

In this way, the plate 24 is able to move between a first position corresponding to the ice cream dispensing condition in which the first nozzle 25 is in fluid communication with the outfeed pipe 12 (FIGS. 4 and 6), and a second position corresponding to the shake dispensing condition in which the second nozzle 26 is in fluid communication with the outfeed pipe 12 (FIGS. 5 and 7).

The plate 24 also has an extended grip portion 29 projecting beyond the volumetric dimensions of the tap 11 to allow manual movement of the plate 24 between the first and the second positions.

The plate 24 also has a curved cavity 30 positioned on the opposite side to the grip portion 29. Extending inside the cavity 30 there is a pin 31 projecting from the wall 27 and able to slide in the cavity 30.

In this way, acting on the grip portion 29 it is possible to rotate the plate 24 about the pin 28a to make the cavity 30 slide on the respective pin 31. In this situation it should be noticed that the curved cavity 30 extends in a substantially semi-circular shape, having at its center the pin 28a on which the plate 24 pivots.

It should also be noticed that the rotation of the plate 24 between the first and the second positions occurs in a respective horizontal plane in which the plate 24 lies, forming a curved path "P" on which the first and second nozzles 25, 26 are positioned.

In particular, each nozzle 25, 26 consists of an opening 25a, 26a for the passage of the product, made between the pivoting portion 28 and the curved cavity 30, on the path "P" which is parallel with the extension of the cavity 30. The passage opening 25a forming the first nozzle 25 is larger than the passage opening 26a forming the second nozzle 26, and has a substantially irregular shape forming a "star-shaped" outline suitable for giving a particular appearance to the ice cream forced out through the first nozzle 25. In contrast, the passage opening 26a forming the second nozzle 26 has a circular shape, suitable for dispensing a liquid product such as a shake.

The selection means 23 also comprise a control element 32 operatively connected to the circuits 5, 16, and to the plate 24 to control the dispensing of ice cream or shake depending on the positioning of the plate 24.

In particular, the control element 32 has an electronic control unit 33 schematically illustrated in FIG. 2 and operatively associated with the pump 19 of the auxiliary processing circuit 16, the heating element 18, the movement means 10, the pumps 22 of the syrup feed circuits 20 and the dispenser means 13.

The control element 32 also has a sensor 34 associated with the control unit 33 and positioned at the tap 11 to detect the positioning of the plate 24. Advantageously, the sensor 34 is of the magnetic type and is connected to the plate 24 to detect the positions of the plate 24 and consequently to send corresponding signals to the control unit 33 through respective transmission means 35.

In more detail, when the plate 24 is in the first position, the transmission means 35 send the control unit 33 a first signal S1 for activating the mixer 9 movement means 10. When the plate 24 is in the second position, the transmission means 35 send the control unit 33 a second signal S2 for activating the mixer 9 movement means 10, the pump 19 of the auxiliary processing circuit 16 and the heating element 18.

In this way, the electronic control unit 33 controls dispensing only of the product to be processed or of the product to be processed plus the diluting liquid depending on the positioning of the plate 24. Advantageously, when the plate 24 is in the first position, only the product to be processed for making ice cream is dispensed in the mixing chamber 6. Alternatively, if the plate 24 is in the second position, both the product to be processed and the diluting liquid for making shake are dispensed in the mixing chamber 6.

The control element 32 also has a device 36 for selecting the flavoring syrup, operatively connected to the electronic control unit 33 to switch on/off the pumps 22 of the syrup feed circuits 20.

In particular, the selecting device 36 has a control panel (schematically illustrated) for selecting the type of syrup to be dispensed in the mixing chamber 6 corresponding to a particular flavor to be given to the ice cream or shake.

In this way, the products dispensed by the machine 1 may be neutral or flavored with syrups having different flavors.

In practice, when an ice cream is to be dispensed, the plate 24 is manually positioned in the respective first position in which the first nozzle 25 is in fluid communication with the outfeed pipe 12.

The sensor 34 detects the positioning of the plate 24 and sends the signal S1 to the electronic control unit 33 which activates the mixer 9 movement means 10. In this way, the product contained in the tank 3 is dispensed through the freezing chamber 4 into the mixing chamber 6. Moreover, acting on the selecting device 36 it is possible to feed a syrup into the mixing chamber 6. In other words, after the command sent by the selecting device 36, the control unit 33 also activates a pump 22 corresponding to the feed circuit of a predetermined syrup.

The mixing element 14 mixes the ice cream with the syrup in the chamber 6, and the actuator 15 allows the ice cream to reach and pass through the outfeed pipe 12.

In this situation, it should be noticed that the dispenser means 13 may be activated directly by the control unit 33 after a predetermined signal. Alternatively, the dispenser means 13 may be activated manually by the operator.

The ice cream passes through the outfeed pipe 12 and is forced out through the first nozzle 25, suitable for dispensing that specific product.

When the shake is to be dispensed, the plate 24 is rotated to the second position in which the second nozzle 26 is in fluid communication with the outfeed pipe 12.

In this situation the sensor 34 sends the second signal S2 to activate not just the mixer 9 movement means 10 but also the pump 19 of the auxiliary processing circuit 16. In this way, the product to be processed contained in the tank 3 and the diluting liquid housed in the tank 17 are distributed in the mixing chamber 6. Advantageously, the control unit 33 also activates the heating element 18 to heat the diluting liquid and obtain a shake which is much less dense than the ice cream.

The mixing element 14 then mixes the product to be processed with the diluting liquid and with any syrup present to make the shake which is forced out of the second nozzle 26.

Advantageously, it should be noticed that the machine 1 allows the dispensing of ice cream and shake by adapting the dispending nozzle according to the specific product.

The ice cream is forced out through the first nozzle 25 which has a larger opening and an irregular outline to give the ice cream an attractive shape. In contrast, the shake is forced out of the second nozzle 26 which is much smaller and has a circular outline to keep the flow of shake compact and avoid any turbulence in the flow.

The invention described above is susceptible of industrial application and may be modified and adapted in several ways without thereby departing from the scope of the inventive concept. Moreover, all details of the invention may be substituted by technically equivalent elements.

What is claimed is:

1. A machine for making two different types of frozen product, comprising:
   a mixing chamber having an outfeed pipe;
   a main processing circuit for making ice cream, having an infeed end associated with a tank for containing a product to be processed, and an outfeed end associated with the mixing chamber;
   an auxiliary processing circuit for making a shake, having an infeed end associated with a tank for containing a diluting liquid, and an outfeed end associated with the mixing chamber;
   a dispenser mechanism for dispensing the ice cream and the shake, positioned at the mixing chamber; and
   a selection device for selecting the product to be dispensed by moving between an ice cream dispensing condition and a shake dispensing condition;
   wherein the selection device comprises at least a first and a second nozzle, one of the at least first and second nozzles associated with the ice cream dispensing condition and the other one of the at least first and second nozzles associated with the shake dispensing condition, wherein pivoting movement of the selection device between the ice cream dispensing condition and the shake dispensing condition moves both the at least first and second nozzles alternatively associating the at least first and second nozzles with the mixing chamber in the corresponding dispensing condition and in the ice cream dispensing condition the one of the at least first and second nozzles associated with the ice cream dispensing condition is flowingly connected with the mixing chamber outfeed pipe and the other of the at least first and second nozzles associated with the shake dispensing condition is flowingly disconnected from the mixing chamber outfeed pipe and in the shake dispensing condition the other of the at least first and second nozzles associated with the shake dispensing condition is flowingly connected with the mixing chamber outfeed pipe and the one of the at least first and second nozzles associated with the ice cream dispensing condition is flowingly disconnected from the mixing chamber outfeed pipe.

2. The machine according to claim 1, wherein the selection device further comprises a plate associated downstream of and placed below the mixing chamber outfeed pipe; the plate including two openings, each corresponding to a respective opening of each nozzle.

3. The machine according to claim 2, wherein the plate is movably engaged with a dispenser tap forming the mixing chamber outfeed pipe, to be movable and pivotable between a first position corresponding to the ice cream dispensing condition in which the first nozzle is in communication with the outfeed pipe, and a second position corresponding to the shake dispensing condition in which the second nozzle is in communication with the outfeed pipe.

4. The machine according to claim 3, wherein the plate has a portion pivoting at the tap and a curved cavity in which there extends a pin projecting from the tap; the plate rotatable about the pivoting portion, to make the cavity slide on the respective pin, and along a respective plane in which the plate lies between the first and second positions, forming a curved path on which the first and second nozzles are positioned.

5. The machine according to claim 1, wherein the first nozzle comprises an opening for passage of the product which is larger than the opening for passage of the product forming the second nozzle.

6. The machine according to claim 1, wherein the first nozzle has an opening for passage of the product having an irregular shape forming a "star-shaped" outline.

7. The machine according to claim 1, wherein the auxiliary processing circuit comprises: a heating element inserted between the tank for containing the diluting liquid and the outfeed end to heat the diluting liquid dispensed in the mixing chamber; and a pump for feeding the liquid towards the mixing chamber.

8. The machine according to claim 1, wherein the main processing circuit further comprises: a freezing chamber having a rear end associated with the tank for containing the product to be processed and a front end forming the outfeed end of the main processing circuit; a mixer housed in the freezing chamber to feed forward the product to be processed from the rear end to the front end; and a mixer movement mechanism.

9. The machine according to claim 8, wherein the selection device also comprises a control element operatively connected to the processing circuits and to the plate to control the dispensing of ice cream or shake depending on the positioning of the plate.

10. The machine according to claim 9, wherein the control element comprises: an electronic control unit operatively associated with the pump of the auxiliary processing circuit, the heating element and the mixer movement mechanism: and a sensor for detecting the positioning of the plate and operatively associated with the electronic control unit.

11. The machine according to claim 10, wherein the sensor comprises a transmission system which, when the plate is in a first position, sends the control unit a first signal for activating the mixer movement mechanism and, when the plate is in the second position, sends the control unit a second signal for activating the mixer movement mechanism, the pump of the auxiliary processing circuit and the heating element.

12. The machine according to claim 10, also comprising at least one feed circuit for a flavoring syrup having an infeed end associated with a tank for containing a respective syrup and an outfeed end associated with the mixing chamber; the electronic control unit being associated with a pump of the feed circuit for the flavoring syrup.

13. The machine according to claim 12, wherein the control element also comprises a device for selecting the flavoring syrup, operatively associated with the electronic control unit for switching on or off the pump of the feed circuit for the flavoring syrup.

14. The machine according to claim 10, wherein the dispenser mechanism for dispensing the ice cream or shake further comprises: a mixing element, rotatably housed in the mixing chamber; and an actuator movable inside the mixing chamber to push the ice cream or the shake housed in the mixing chamber towards the outfeed pipe; the electronic control unit being operatively associated with the dispenser mechanism to control actuator movement.

15. A machine for making two different types of frozen product, comprising:
a mixing chamber having an outfeed pipe;
a main processing circuit for making ice cream, having an infeed end associated with a tank for containing a product to be processed, and an outfeed end associated with the mixing chamber;
an auxiliary processing circuit for making a shake, having an infeed end associated with a tank for containing a diluting liquid, and an outfeed end associated with the mixing chamber;
a dispenser mechanism for dispensing the ice cream and the shake, positioned at the mixing chamber; and
a selection device for selecting the product to be dispensed by moving between an ice cream dispensing condition and a shake dispensing condition;
wherein the selection device comprises at least a first nozzle and a second nozzle, placed below the mixing chamber outfeed pipe, one of the at least first and second nozzles associated with the ice cream dispensing condition and the other one of the at least first and second nozzles associated with the shake dispensing condition, wherein movement of the selection device between the ice cream dispensing condition and the shake dispensing condition moves both the at least first and second nozzles alternatively associating the first and second nozzles with the mixing chamber in the corresponding dispensing condition and in the ice cream dispensing condition the one of the at least first and second nozzles associated with the ice cream dispensing condition is flowingly connected with the mixing chamber outfeed pipe and the other of the at least first and second nozzles associated with the shake dispensing condition is flowingly disconnected from the mixing chamber outfeed pipe and in the shake dispensing condition the other of the at least first and second nozzles associated with the shake dispensing condition is flowingly connected with the mixing chamber outfeed pipe and the one of the at least first and second nozzles associated with the ice cream dispensing condition is flowingly disconnected from the mixing chamber outfeed pipe.

16. A machine for making two different types of frozen product, comprising:
a mixing chamber having an outfeed pipe;
a main processing circuit for making ice cream, having an infeed end associated with a tank for containing a product to be processed, and an outfeed end associated with the mixing chamber;
an auxiliary processing circuit for making a shake, having an infeed end associated with a tank for containing a diluting liquid, and an outfeed end associated with the mixing chamber;
a dispenser mechanism for dispensing the ice cream and the shake, positioned at the mixing chamber; and
a selection device for selecting the product to be dispensed by pivoting and switching the selection device between an ice cream dispensing condition and a shake dispensing condition;
wherein the selection device comprises at least a first and a second nozzle, the first nozzle associated with the ice cream dispensing condition and the second nozzle associated with the shake dispensing condition, wherein pivoting movement of the selection device between the ice cream dispensing condition and the shake dispensing condition moves both the first and second nozzles alternatively associating the first and second nozzles with the mixing chamber in the corresponding dispensing condition and in the ice cream dispensing condition the first nozzle associated with the ice cream dispensing condition is flowingly connected with the mixing chamber outfeed pipe and the second nozzle associated with the shake dispensing condition is flowingly disconnected from the mixing chamber outfeed pipe and in the shake dispensing condition the second nozzle associated with the shake dispensing condition is flowingly connected with the mixing chamber outfeed pipe and the first nozzle associated with the ice cream dispensing condition is flowingly disconnected from the mixing chamber outfeed pipe; the first nozzle comprising an opening for the passage of the ice cream which is larger than the opening for the passage of the shake forming the second nozzle.

17. A machine for making two different types of frozen product, comprising:
   a mixing chamber having an outfeed pipe;
   a main processing circuit for making ice cream, having an infeed end associated with a tank for containing a product to be processed, and an outfeed end associated with the mixing chamber;
   an auxiliary processing circuit for making a shake, having an infeed end associated with a tank for containing a diluting liquid, and an outfeed end associated with the mixing chamber;
   a dispenser mechanism for dispensing the ice cream and the shake, positioned at the mixing chamber; and
   a selection device for selecting the product to be dispensed by switching the selection device between an ice cream dispensing condition and a shake dispensing condition;
   wherein the selection device comprises at least one plate associated downstream of and placed below the mixing chamber outfeed pipe; the plate including a first hole corresponding to a first nozzle for passage of the product and a second hole corresponding to a second nozzle for passage of the product, one of the nozzles associated with the ice cream dispensing condition and another of the nozzles associated with the shake dispensing condition, each of which is alternatively associated with the mixing chamber outfeed pipe in the corresponding dispensing condition;
   wherein the plate is pivotable and switchable to simultaneously move both the first and second nozzles between a first position corresponding to the ice cream dispensing condition in which the first nozzle is in fluid communication with the mixing chamber outfeed pipe and the second nozzle is flowingly disconnected from the mixing chamber outfeed pipe, and a second position corresponding to the shake dispensing condition in which the second nozzle is in fluid communication with the mixing chamber outfeed pipe and the first nozzle is flowingly disconnected from the mixing chamber outfeed pipe.

* * * * *